US011983546B2

(12) United States Patent
Huang et al.

(10) Patent No.: US 11,983,546 B2
(45) Date of Patent: *May 14, 2024

(54) RENDERING CONTENT OF SERVICE PROVIDERS VIA WEB PAGE HAVING DYNAMICALLY-LOADED PLUGINS

(71) Applicant: Citrix Systems, Inc., Fort Lauderdale, FL (US)

(72) Inventors: Feng Huang, Girton (GB); Henry Ashman, Upper Cambourne (GB)

(73) Assignee: Citrix Systems, Inc., Fort Lauderdale, FL (US)

(*) Notice: Subject to any disclaimer, the term of this patent is extended or adjusted under 35 U.S.C. 154(b) by 474 days.

This patent is subject to a terminal disclaimer.

(21) Appl. No.: 17/173,492

(22) Filed: Feb. 11, 2021

(65) Prior Publication Data

US 2021/0165667 A1    Jun. 3, 2021

Related U.S. Application Data

(63) Continuation of application No. 16/185,733, filed on Nov. 9, 2018, now Pat. No. 10,936,337.

(51) Int. Cl.
*G06F 9/445* (2018.01)
*G06F 3/0483* (2013.01)
(Continued)

(52) U.S. Cl.
CPC ........ *G06F 9/44526* (2013.01); *G06F 3/0483* (2013.01); *H04L 9/30* (2013.01);
(Continued)

(58) Field of Classification Search
CPC .... G06F 9/445; G06F 9/44526; G06F 3/0483; H04L 67/02; H04L 67/01; H04L 2209/76;
(Continued)

(56) References Cited

U.S. PATENT DOCUMENTS 6,438,594 B1    8/2002    Bowman-Amuah
6,523,027 B1    2/2003    Underwood
(Continued)

FOREIGN PATENT DOCUMENTS

CN    102339291 A    *    2/2012
WO    2017205241        11/2017

OTHER PUBLICATIONS

"OAuth 2.0 Single Sign On Authentication in Chrome Extension"— Sai Umesh Dhanewar, Medium, Apr. 9, 2018 https://medium.com/tech-buddy/oauth-2-0-single-sign-on-authentication-in-chrome-extension-8f3f3ffd89c7 (Year: 2018).*
(Continued)

*Primary Examiner* — Randy A Scott

(57) ABSTRACT

A technique for rendering web content includes downloading a framework page from a framework server, the framework page including framework code which, when executed by a browser of a client machine, dynamically downloads a set of plugins from respective service providers. Each plugin includes its own plugin code configured to communicate with the respective service provider and with the framework code, to dynamically render web content specific to the service provider in the framework page running in the browser.

20 Claims, 4 Drawing Sheets

(51) Int. Cl.
*H04L 9/30* (2006.01)
*H04L 9/40* (2022.01)
*H04L 29/06* (2006.01)
*H04L 29/08* (2006.01)
*H04L 67/01* (2022.01)
*H04L 67/02* (2022.01)

(52) U.S. Cl.
CPC .......... *H04L 63/0815* (2013.01); *H04L 67/01* (2022.05); *H04L 67/02* (2013.01)

(58) Field of Classification Search
CPC ....... H04L 9/3247; H04L 67/06; H04L 67/34; H04L 9/0825; H04L 9/30; H04L 63/0815
See application file for complete search history.

(56) References Cited

U.S. PATENT DOCUMENTS

| | | | |
|---|---|---|---|
| 6,601,233 B1 | 7/2003 | Underwood | |
| 6,609,128 B1 | 8/2003 | Underwood | |
| 6,633,878 B1 | 10/2003 | Underwood | |
| 6,718,535 B1 | 4/2004 | Underwood | |
| 7,069,271 B1 | 6/2006 | Fadel et al. | |
| 7,100,195 B1 | 8/2006 | Underwood | |
| 7,409,710 B1* | 8/2008 | Uchil ...................... | H04L 63/08 726/19 |
| 8,327,427 B2* | 12/2012 | Soukup ............... | H04L 63/0815 713/168 |
| 8,528,065 B2* | 9/2013 | Ramos Robles . | H04W 12/0431 713/168 |
| 8,849,985 B1 | 9/2014 | Colton et al. | |
| 9,015,596 B1 | 4/2015 | Franklin et al. | |
| 2003/0163733 A1* | 8/2003 | Barriga-Caceres ..... | H04L 67/51 726/5 |
| 2007/0204329 A1 | 8/2007 | Peckover | |
| 2010/0115430 A1 | 5/2010 | Skirpa | |
| 2013/0185164 A1 | 7/2013 | Pottjegort | |
| 2015/0007274 A1 | 1/2015 | Chang et al. | |

OTHER PUBLICATIONS

"SSO Using Web Services Authentication"—Symantec Access Management Community, Broadcom, Jan. 11, 2017 https://community.broadcom.com/communities/community-home/digestviewer/viewthread?MID=762653 (Year: 2017).*

Alexander Zlatkov, "How JavaScript works: the rendering engine and tips to optimize its performance", 14 pages, downloaded from https://blog.sessionstack.com/how-javascript-works-the-rendering-engine-and-tips-to-optimize-its-performance-7b95553baeda.

Ilya Grigorik, "Constructing the Object Model" Chrome Dev Summit 2018, 7 pages, downloaded from https://developers.google.com/web/fundamentals/performance/critical-rendering-path/constructing-the-object-model.

w3schools.com, "JavaScript HTML DOM", Copyright 1999-2018, 6 pages, downloaded from https://www.w3schools.com/js/js_htmldom.asp.

Ilya Kantor, "Dom Tree", Copyright 2007-2018, 10 pages, downloaded from https://javascript.info/dom-nodes.

* cited by examiner

RENDERING CONTENT OF SERVICE PROVIDERS VIA WEB PAGE HAVING DYNAMICALLY-LOADED PLUGINS

CROSS-REFERENCE TO RELATED APPLICATIONS

This application is a continuation of U.S. patent application Ser. No. 16/185,733, filed Nov. 9, 2018, the contents and teachings of which are incorporated herein by reference in their entirety.

BACKGROUND

Numerous websites act as aggregators of diverse web services. For example, a website served from one Internet address may include links to applications served from other Internet addresses. The links allow users to access each of the applications from a common landing page.

In some arrangements, a website may include not only links to applications, but also user-interface (UI) components for controlling the linked-to applications. Such UI components enable users to operate functionality of linked-to applications without leaving the current page.

In addition, some arrangements support single sign-on (SSO). For example, a user may authenticate to an aggregating website, and authentication to that site may provide the user with access to any of the linked-to applications, without requiring the user to log on separately to each application.

SUMMARY

Unfortunately, prior arrangements for aggregating web services can involve shortcomings. For example, developers of an aggregating website may face a difficult task in integrating UI code from different application providers. A developer typically receives software components from multiple providers. The developer may compact the components into a small number of modules, which together form a new software release. The compacted modules tend to have many interlocking parts and dependencies, however, which can make them difficult to maintain. For example, a small software change in UI code for one application provider may cause a ripple effect that necessitates a complete overhaul of an entire module.

SSO can also present challenges. In some cases, an aggregating website provides its own methodology for authentication. But that methodology may not readily be transferrable to the service providers, which may already have developed their own schemes for authenticating users. As a result, the service providers may have to rework their authentication schemes to be compatible with that of the aggregating site. Alternatively, the service providers may force users to authenticate to their own services separately, which would mean giving up on SSO entirely.

In contrast with prior approaches, an improved technique for rendering web content includes downloading a framework page from a framework server, the framework page including framework code which, when executed by a browser of a client machine, dynamically downloads a set of plugins from respective service providers. Each plugin includes its own plugin code configured to communicate with the respective service provider and with the framework code, to dynamically render web content specific to the service provider in the framework page running in the browser.

Advantageously, the improved technique decouples the framework page from contents of the plugins, effectively enabling the framework page to implement a static or seldom-changed shell while allowing the service providers to update their own components directly, by revising the plugins. As the framework page loads the plugins dynamically, any change made by plugin developers is reflected in rendered framework pages without delay and typically without any involvement of developers of the framework page.

In some examples, the framework code and a plugin each inform the other of its own capabilities, enabling the framework code to adapt dynamically to changes in functionality of the plugin, and vice-versa.

In some examples, a plugin sends a request to the framework code to render a UI element. In response to the request, the framework code returns a DOM (Document Object Model) element to the plugin. The plugin assigns one or more attributes to the DOM element based on content received from the service provider, and the browser displays the DOM element with the assigned attributes.

In some examples, a plugin responds to a request to access the respective service provider by requesting SSO authentication. The plugin initiates activities to obtain a framework token from the framework server and to request that the service provider (SP) exchange the framework token for an SP token, based on a pre-established trust relationship between the framework and the SP. The SP token enables authenticated communication to proceed between the plugin and the respective SP without requiring additional user action.

Certain embodiments are directed to a method of rendering web content of service providers (SPs). The method includes downloading, by a browser running on a client machine, a framework page from a framework server, the framework page including framework code, and running the framework code by the browser. The framework code directs the client machine to download a set of plugins from respective SPs over a computer network. Each of the set of plugins includes respective plugin code. For each of the set of plugins, the method further includes running the respective plugin code by the browser, the respective plugin code (i) communicating with the respective SP and with the framework code and (ii) directing the browser to render, in the framework page, web content received by the plugin from the respective SP.

Other embodiments are directed to a client machine constructed and arranged to perform a method of rendering web content of service providers, such as the method described above. Still other embodiments are directed to a computer program product. The computer program product stores instructions which, when executed by control circuitry of a client machine, cause the client machine to perform a method of rendering web content of service providers, such as the method described above.

The foregoing summary is presented for illustrative purposes to assist the reader in readily grasping example features presented herein; however, this summary is not intended to set forth required elements or to limit embodiments hereof in any way. One should appreciate that the above-described features can be combined in any manner that makes technological sense, and that all such combinations are intended to be disclosed herein, regardless of whether such combinations are identified explicitly or not.

BRIEF DESCRIPTION OF THE SEVERAL VIEWS OF THE DRAWINGS

The foregoing and other features and advantages will be apparent from the following description of particular embodiments of the invention, as illustrated in the accompanying drawings, in which like reference characters refer to the same or similar parts throughout the different views.

DETAILED DESCRIPTION OF THE INVENTION

Embodiments of the invention will now be described. It should be appreciated that such embodiments are provided by way of example to illustrate certain features and principles of the invention but that the invention hereof is not limited to the particular embodiments described.

An improved technique for rendering web content includes downloading a framework page from a framework server. The framework page includes framework code which, when executed by a browser of a client machine, dynamically downloads a set of plugins from respective service providers. Each plugin includes its own plugin code configured to communicate with the respective service provider and with the framework code, to dynamically render web content specific to the service provider in the framework page running in the browser.

Figure 1:
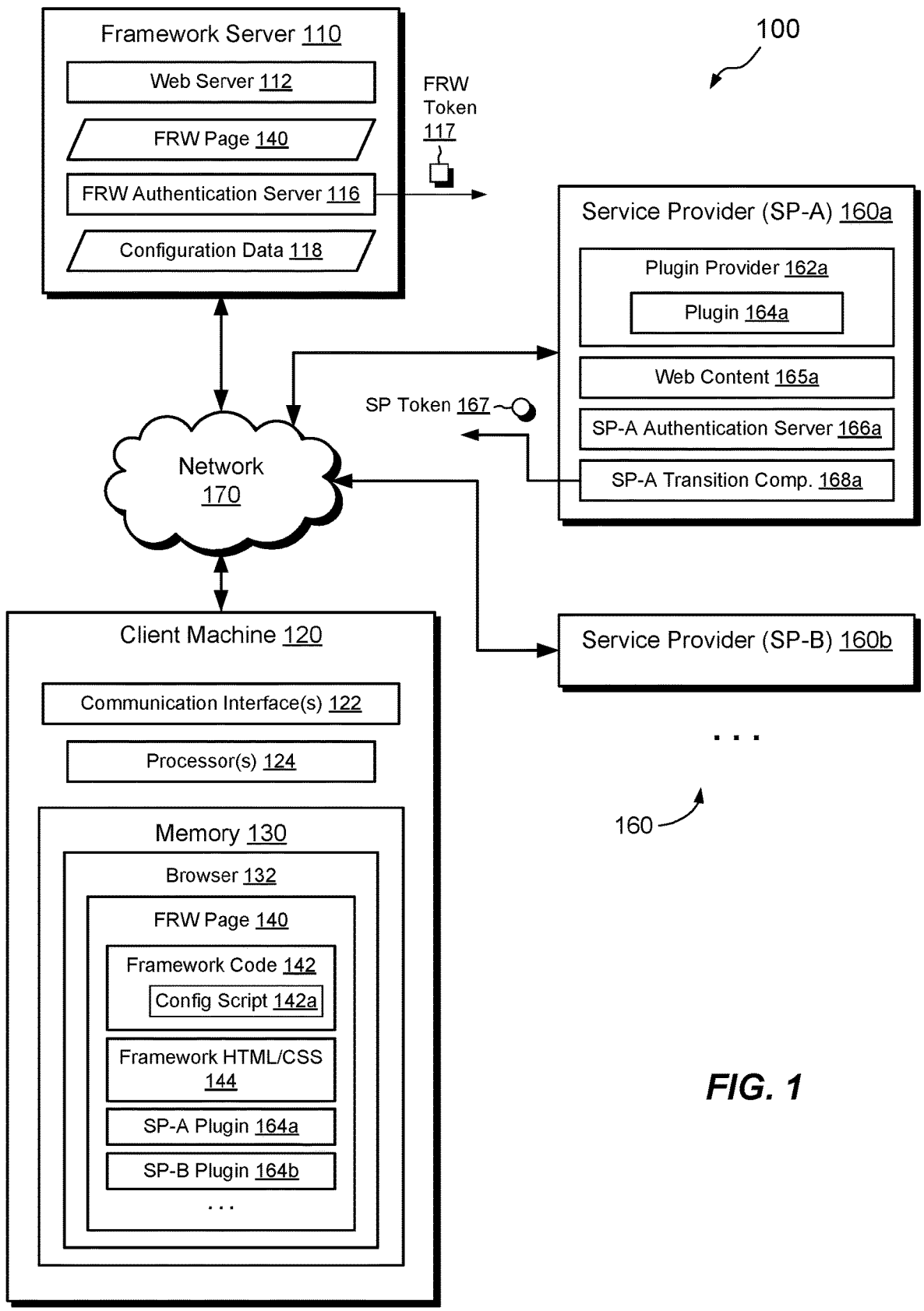
FIG. 1 is a block diagram of an example environment in which embodiments of the improved technique hereof can be practiced.

FIG. 1 shows an example environment 100 in which embodiments of the improved technique can be practiced. Here, a framework server 110, a client machine 120, and any number of service providers (SPs) 160 connect to a network 170. The network 170 may be any type of network or combination of networks, such as the Internet, another wide area network (WAN), one or more local area networks (LANs), and/or some other type of network or combination of networks, for example.

The framework server 110 "includes," i.e., realizes by execution of software instructions, a webserver 112, a framework ("FRW") authentication server 116, and configuration data 118. The webserver 112 is configured to serve web pages to network clients, such as client machine 120. One such web page is a framework page 140.

The framework authentication server 116 is configured to authenticate users and/or devices to resources stored by or otherwise accessible to the framework server 110. For example, the framework authentication server 116 may require a user to be authenticated before the web server 112 is permitted to supply the framework page 140 to that user's machine. Alternatively, the framework authentication server 116 may itself be a service provider that supplies a login user interface, and a user may be authenticated after the framework page has loaded.

The configuration data 118 includes information about SPs 160 that have registered with the framework server 110, including network addresses of SP plugins 164, network addresses of SSO (Single Sign-On) endpoints of the SPs 160, and trust information about SPs 160, such as a public key of each SP 160. The framework server 110 may be implemented as a single computer or as multiple computers that operate in a coordinated fashion, e.g., in a server group or cluster.

The SPs 160 are typically computers or groups of computers that serve content and/or provide functionality of a particular kind. For example, one SP 160a may provide cloud-based storage of data, another SP 160b may provide desktop virtualization services, and yet another SP (not shown) may provide application virtualization services. However, there is no limit to the types of functionality that SPs 160 may provide.

As shown by way of example in SP 160a, which is intended to be representative of all SPs 160, the SP 160a includes a plugin provider 162a, web content 165a, authentication server 166a, and transition component 168a. The plugin provider 162a stores or otherwise has access to a plugin 164a, which the plugin provider 162a may supply to authorized web clients, such as client machine 120. In general, a plugin 164 is configured to be downloaded to a client-side web page and to act as an intermediary between the client and the respective SP 160. The authentication server 166a performs authentication on behalf of the SP 160a, for restricting access to the particular service or other web content 165a that the SP provides. For example, if SP 160a provides cloud-storage services, which include storing files as web content 165a, then the authentication server 166a may require a user to be authenticated to the SP 160a before allowing that user to access particular files stored by the service. Such SP authentication is separate from any authentication performed by the framework authentication server 116. The transition component 168a is configured to support SSO by trading a framework token 117 issued by the framework authentication server 116 in exchange for an SP token 167 compatible with the SP 160a. For example, the framework server 110 and the SP 160a establish a trust relationship, which enables the SP authentication server 166a to give credit to authentication performed by the framework authentication server 116 and to provide an SP token 167 for enabling user access to the services of SP 160a.

One should appreciate that different SPs 160 may use different authentication methods and may produce SP tokens 167 that differ from one another. e.g., in format and/or contents. Such SP tokens 167 may also differ from framework tokens 117 issued by the framework authentication server 116. Rather than attempting to make these diverse tokens compatible with one another, embodiments instead provide the SP transition component 168a, which allows the tokens to be different by supporting an exchange of valid framework tokens 117 for SP tokens 167. Such embodiments avoid placing excessive burdens on SP developers. For example, rather than having to redesign authentication methods and tokens to be compatible with the framework server 110, SP developers need merely to provide a transition component 168a. In some examples, the transition component 168a stores a public key of the framework server 110, such that the framework server 110 and the SP 160a each have access to the other's public key. Each retains a corresponding private key, which is not shared.

As further shown in FIG. 1, the client machine 120 includes one or more communication interfaces 122, a set of processors 124, and memory 130. The communication interfaces 122 include, for example, network interface adapters (e.g., Ethernet, Wi-Fi, etc.) for exchanging electronic and/or radiofrequency signals received over the network 170. The set of processors 124 includes one or more processing chips and/or assemblies. The memory 130 includes both volatile memory, e.g., Random Access Memory (RAM), and non-volatile memory, such as one or more ROMs (Read-Only Memories), disk drives, solid state drives, and the like. The set of processors 124 and the memory 130 together form control circuitry, which is constructed and arranged to carry out various methods and functions as described herein. Also, the memory 130 includes a variety of software constructs realized in the form of executable instructions. When the executable instructions are run by the set of processors 124, the set of processors 124 carry out the operations of the software constructs. Although certain software constructs are specifically shown and described, it is understood that the memory 130 typically includes other software, which is not shown, such as an operating system, various applications, processes, and daemons.

As still further shown in FIG. 1, the memory 130 includes a web browser 132, such as a commercially-available browser (e.g., Google Chrome, Microsoft Internet Explorer, Mozilla Firefox, Apple Safari, and so forth). The browser 132 is capable of connecting to the network 170 and downloading content from the framework server 110 and the SPs 160. For example, the browser 132 may download and render the framework page 140.

One should appreciate that the client machine 120 may be any computing machine or device capable of connecting to a network and running a browser. Suitable examples of client machines include but are not limited to desktop computers, laptop computers, tablet computers, smart phones, personal data assistants (PDAs), set top boxes, gaming consoles, Internet-of-Things (IOT) devices, automotive control consoles, and so forth, for example.

In example operation, a user operates the client machine 120 and opens the browser 132, such as by tapping or double-clicking an icon or link. The user operates the browser 132 to navigate to a website hosted by the webserver 112 in the framework server 110. For example, the user clicks a link or taps a bookmark, which causes the browser 132 to contact the webserver 112 over the network 170 and request the framework page 140, e.g., using HTTP (HyperText Transfer Protocol), HTTPS (HTTP Secure), or the like. In response to receiving the request, the webserver 112 returns a copy of the framework page 140 to the client machine 120. The client machine 120 thereby downloads the framework page 140.

In an example, the framework page 140 is a single web page that contains framework code 142, such as JavaScript or vbScript, and framework HTML/CSS 144, which includes HTML (HyperText Markup Language) and CSS (Cascading Style Sheets). The framework code 142 may be embedded in the framework page 140 as provided by the webserver 112, or it may be incorporated, in whole or in part, from one or more separate files (e.g., .js files), which may be linked-to by the framework page 140 and downloaded from the webserver 112. The framework code 142 may also be referred to herein as "core code" or "core JavaScript"). This is the code that is part of the page 140 as provided by the framework server 110, prior to inclusion of plugins 164, which are supplied by the SPs 160. Style information may also be provided inline with HTML and/or included in separate style sheets (e.g., .css files), which are linked to by the framework page 140 and downloaded from the webserver 112.

Once the browser 132 has downloaded the framework page 140 and its associated .js and/or .css files (if provided), the browser 132 begins to render the framework page 140. As it does so, the browser 132 encounters a configuration script 142a within the framework code 142. For example, a JavaScript Interpreter, which runs within the browser 132, executes the configuration script 142a automatically as the framework page 140 renders. The configuration script 142a contacts the webserver 112 and requests the configuration data 118, which, as stated previously, includes the network addresses of registered plugins 164 and SSO endpoints. The configuration script 142a receives the configuration data 118 and proceeds to download each of the indicated plugins 164 from their respective locations. For example, the configuration script enters the code of plugins 164a and 164b as respective scripts at the end of the framework page 140. Plugins 164 for other registered SPs 160 (if there are any) are also entered at this time.

Once plugins 164 are written into the framework page 140, the code of those plugins begins to run automatically. In an example, each plugin 164 begins running by registering itself with the framework code 142. Registration of each plugin 164 may include, for example, exchanging capabilities with the framework code 142. For instance, each plugin 164 sends the framework code 142 a data structure or other object that lists the properties and/or methods supported by that plugin, which are accessible to the framework code 142. Likewise, the framework code 142 replies by sending back a data structure or other object that lists the properties and/or methods that the framework code 142 supports, which are accessible to the plugin 164. With the framework code 142 and the plugin 164 each informed of the capabilities of the other, communication between the two may ensue. For example, the plugin 164 may request that the framework code 142 provide a DOM (Document Object Model) element, such as a <DIV>, <SPAN>, <IFRAME>, or the like, into which to render content of the respective SP 160. For example, the plugin 164 requests the DOM element as a result of the capabilities exchange informing the plugin that the framework code 142 supports providing a DOM element. The plugin 164, upon receiving the DOM element, proceeds to populate the DOM element with content, e.g., by assigning attributes of the DOM element to specific values. The browser 132 may then render the DOM element, such that it is viewable by the user. In an example, the DOM element is a <DIV> (division or section) within the scope of the framework page 140, and the plugin may obtain the <DIV>, assign it a name, and provide web content 165a within the <DIV>. The content may include information downloaded from the respective SP 160, i.e., the one for which the plugin 164 was provided. The framework page 142 thereby renders SP-specific content obtained from the SP 160 via the plugin 164. Activities of this sort may proceed for additional DOM elements and for each of the other downloaded plugins 164.

One should appreciate that no limit is imposed as to the types of DOM elements that may be obtained by plugins and populated with SP-specific content. In some examples, the DOM elements allow for user interaction with the SP 160 via the plugin 164. For example, the DOM elements may include buttons, form controls, and the like, which can communicate with the respective SP 160 and render updated content. In some examples, the plugin 164 and/or framework code 142 employs AJAX (Asynchronous JavaScript and XML) technology to communicate with the webserver 112 and obtain updated content without having to perform additional page loads.

Once each plugin 164 has completed its initialization, the plugin 164 may issue a plugin-ready message. The plugin-ready message informs the framework code 142 that initial processing for the plugin 164 has completed.

The arrangement of FIG. 1 thus provides flexible access to any number of SPs 160 from a single framework page 140. The design of the framework page 140 may itself be static or seldom changed. The specific functionality of each SP 160 is managed by the developers of that SP and made available via the respective plugin 164, which may be arbitrarily simple or complex. Any changes or upgrades to a plugin are managed by the respective SP, and are readily incorporated into the framework page 140, which may (but is not required to) load the plugin dynamically from its source each time the page is downloaded. In addition, the capabilities exchange as described above ensures that the framework code 142 limits its requests of the plugin to only that functionality which the plugin supports. Likewise, the plugin limits its requests of the framework code 142 to only that functionality which the framework code supports. The resulting code base can be upgraded and managed easily, in a modular manner. It also lends itself well to SSO authentication.

Figure 2:
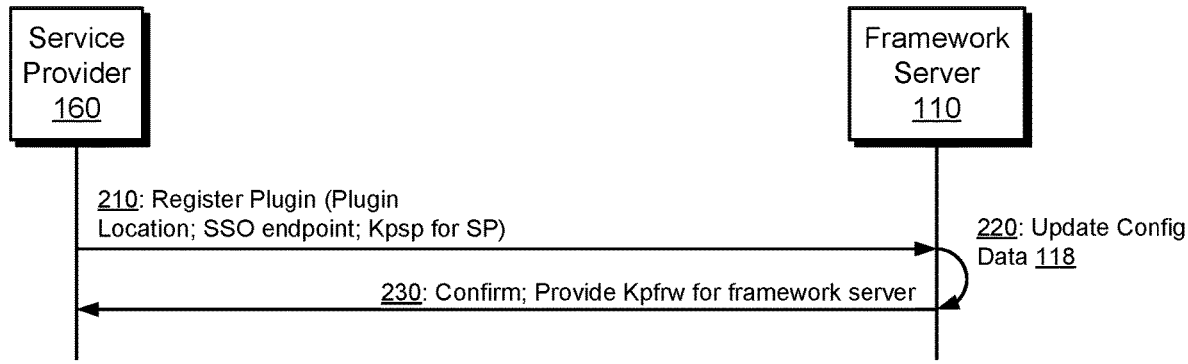
FIG. 2 is a sequence diagram showing an example sequence for registering a service provider (SP) and its plugin with a framework server.

FIG. 2 shows an example sequence whereby an SP 160 registers a plugin 164 with the framework server 110. The illustrated acts of FIG. 2 are generally performed as a precondition for providing access to the SP 160 via the framework page 140, and are generally repeated for each SP 160 for which access via the framework page 140 is desired.

At 210, an SP 160 contacts the framework server 110 and provides a network location of the plugin 164 for that SP and a network location of an SSO endpoint, which serves as a contact location for performing SSO authentication to the SP 160. The SP 160 may specify each network address, for example, as an IP (Internet Protocol) address, as a URL (Uniform Resource Locator), as a URI (Uniform Resource Identifier), or in any other format that identifies the location of the plugin or SSO endpoint on the network 170. During this registration, the SP 160 may also send a public key for the SP 160, Kpsp, to support encrypted communications between the SP 160 and the framework server 110.

At 220, the framework server 110 stores the information received from the SP 160 in the configuration data 118, so that it is available later to the framework page 140 when it runs the configuration script 142a.

At 230, in response to the request at 210, the framework server 110 replies to the SP 160 by confirming receipt of the plugin location, SSO endpoint, and public key, and by providing its own public key, Kpfrw, thereby enabling 2-way encrypted communication.

Figure 3:
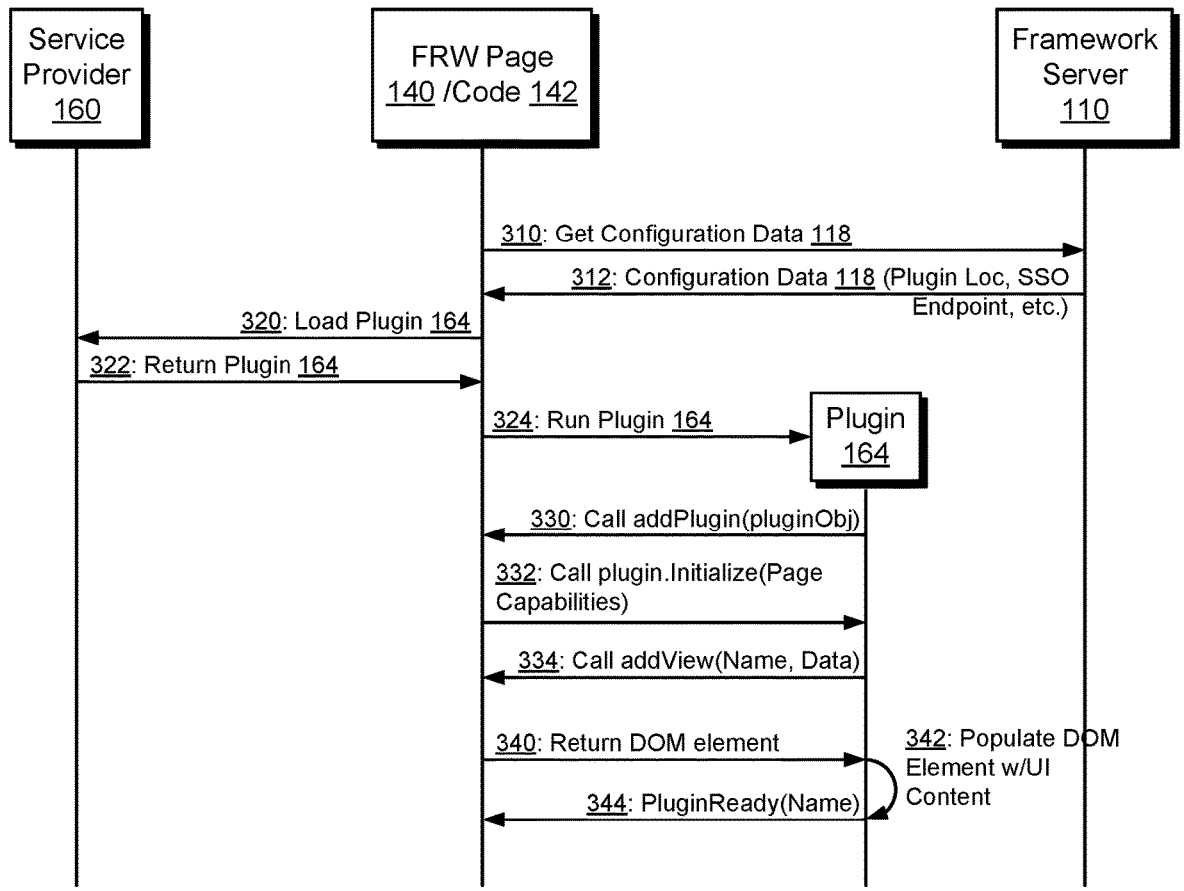
FIG. 3 is a sequence diagram showing an example sequence for loading and initializing one or more plugins into a framework page downloaded to a client machine.

FIG. 3 shows an example sequence whereby the framework page 140, upon being downloaded to the client machine 120, loads and initializes the registered plugins 164. Activity starts at 310, whereupon the framework code 142 runs the configuration script 142a to get configuration information 118. As previously explained, the configuration script 142a may execute automatically when the browser 132 renders the framework page 140.

At 312, the framework server 110 responds to the request of 310 by providing the configuration data 118, e.g., the network location of each registered plugin 164 and the associated SSO endpoint, back to the framework code 142.

At 320, the framework code 142, having received each plugin location, proceeds to contact the associated SPs 160 to obtain the respective plugins 164. At 322, each SP 160 returns the respective plugin 164 to the framework code 142.

At 324, the framework page 140 runs each plugin 164, e.g., by loading the script (or scripts) of each plugin 164 into the framework page 140, e.g., at the end of the page. Loading each plugin 164 has the effect of bringing the plugin into the scope of the framework page 142, such that the plugin has access to the DOM of the framework page 142, and thus can access and manipulate its DOM elements. In an example, each plugin 164 runs automatically once it is loaded.

As each plugin 164 begins to run, at 330, the plugin calls a procedure in the framework code 142 (e.g., a function, subroutine, etc.) to "addPlugin." The procedure call may specify a plugin object or other data structure, which provides a set of properties and/or methods of the plugin 164, which the framework code 142 is able to access.

At 332, in response to receiving the addPlugin call, the framework code 142 issues its own call back to the plugin 164, referred to herein as "plugin.Initialize," which provides an object or other data structure ("Page Capabilities") that identifies a set of properties and/or methods of the framework code 142 that the plugin 164 is able to access. At the conclusion of acts 330 and 332, both the plugin 164 and the framework code 142 have information about the capabilities of the other, and thus can tailor requests that each makes of the other to those capabilities that the other supports. In this manner, the plugin 164 and the framework code 142 are each able to adapt to changes in the capabilities of the other.

For example, the framework page 142 may indicate in its Page Capabilities that it supports an "addView" procedure. Thus, at 334, the plugin 164 may call the addView procedure, e.g., providing a name of the requested view and the data to be displayed. In response, at 340, the framework code 142 returns a DOM element, such as a <DIV> (i.e., an HTML division or section). The framework code 142 may return the <DIV> element in any suitable manner, such as by specifying an identifier of the <DIV> element or by passing it the DOM object for that <DIV>.

At 342, the plugin 164, having received the <DIV>, proceeds to populate the <DIV> with contents, which may include web content 165a that the plugin has obtained from a service provider 160. With the content loaded, the browser 132 displays the populated <DIV> within the framework page 140, thus rendering content from the SP 160 within the framework page 140. One should appreciate that the <DIV> element is merely an example of suitable DOM elements that may be passed and populated.

At 344, the plugin 164, having finished populating the <DIV> element, sends a "pluginReady" message to the framework code 142. The pluginReady message informs the framework code 142 that the plugin has been loaded and initialized. The pluginReady message may specify a name or other identifier of the plugin 164 and may be implemented as a procedure call or other communication.

Processing in the manner described above may proceed for each plugin 164. Such processing may be conducted serially, in parallel, or in any suitable way.

Figure 4:
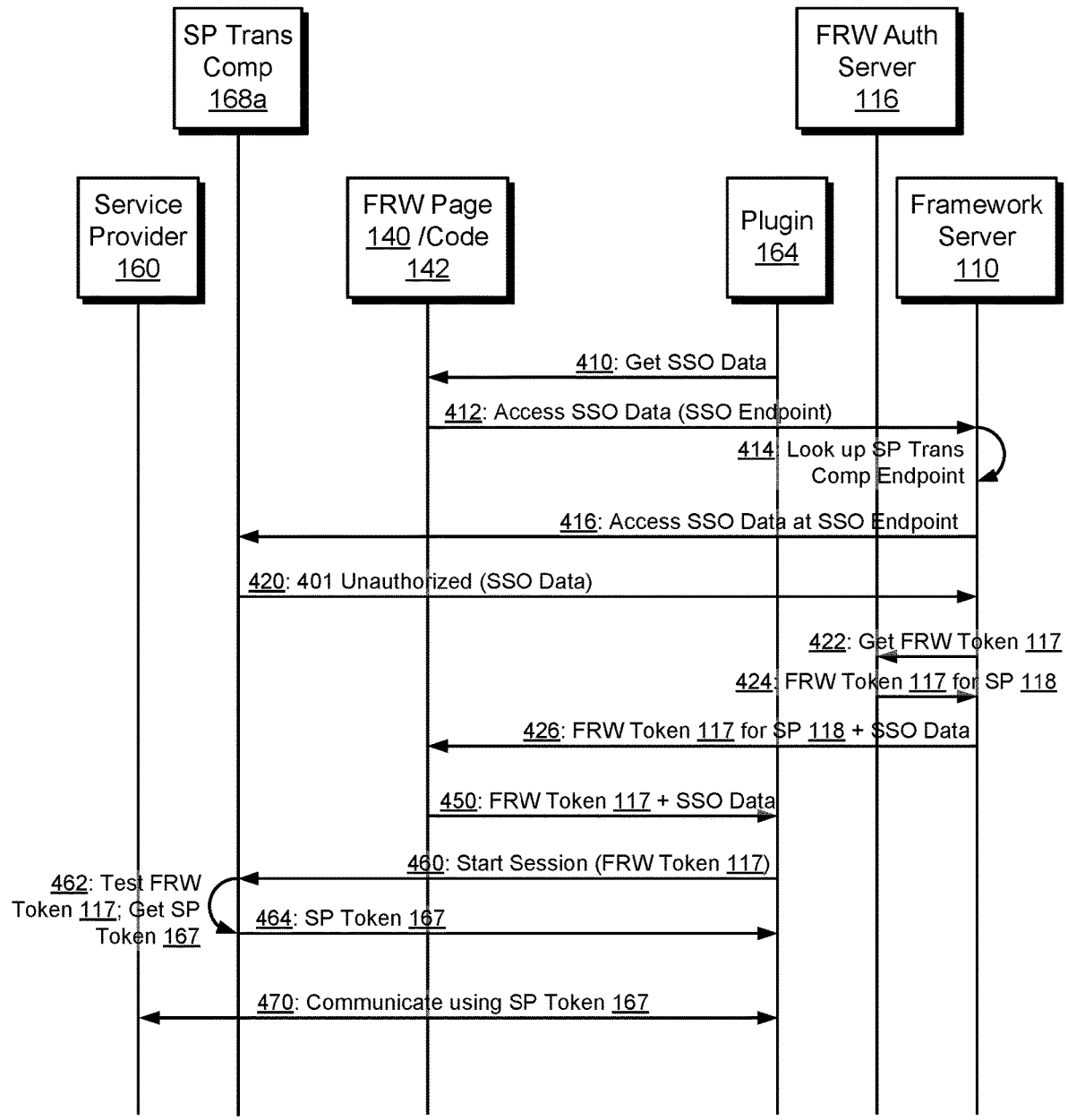
FIG. 4 is a sequence diagram showing an example sequence for implementing SSO (Single Sign-On) to an SP based on a prior authentication to the framework server.

FIG. 4 shows an example sequence whereby a user or device employs SSO to authenticate to a service provider 160. In a preferred example, SSO authentication proceeds entirely transparently to the user. For this example, it is assumed that the user or client machine 120 has already logged on or otherwise authenticated to the framework server 110. For example, before or after downloading the framework page 140, the client machine 120 may have presented a login screen to obtain framework account credentials. Upon successful authentication to the framework server 110, a framework token 117 has been issued to support authenticated communications between the framework server 110 and the client machine 120. In an example, each plugin 164 initiates the activities shown in FIG. 4, either automatically once the plugin loads or in response to a user action, such as clicking a button, link, or other control that is bound to an action that requires accessing resources of the corresponding service provider 160.

For example, at 410, the plugin 164, either automatically or in response to a user action, issues a request to the framework code 142 to "Get SSO Data," i.e., data providing a network address to visit for requesting an SP token for authenticating to the SP 160 (the network address of the transition component 168a of FIG. 1). In response to the request, the framework page 140, at 412, appends the SSO endpoint (received when running the configuration script) to the request and forwards the request to the framework server 110. At 414, the framework server 110 receives the request and looks up the SSO data. At 416, the framework server 110 forwards the request to the SP 160, at the location specified by the SSO endpoint (i.e., to the SP transition component 168a).

At 420, the SP transition component 168a receives the access request and responds by presenting an authentication challenge. For example, the SP transition component 168a issues an HTTP 401 error response code. The SP transition component 168a also provides the requested SSO data. The framework server 110 receives the error code and the SSO data and, at 422, contacts the framework authentication server 116 to request the framework token 117 for SP 160. At 424, the framework server 110 receives the framework token 117 and, at 426, sends the framework token 117 and the SSO data to the framework page 140. In an example, framework server 110 provides the framework token 117 in encrypted form, where the token is encrypted using Kpsp, the public key of the SP 160. The framework server 110 may also sign the encrypted framework token 117, e.g., using its private key (the one corresponding to Kpfrw).

At 450, the framework page 140 passes the framework token 117 and SSO data to the plugin 164, which responds, at 460, by issuing a session request to SP transition component 168a. The session request includes the framework token 117 (encrypted) and is directed to the network address of the transition component 168a, i.e., to the network address specified by the SSO data.

At 462, the transition component 168a tests the received framework token 117 to confirm that it was properly issued by the framework server 110. For example, the transition component 168a checks the signature on the framework token 117 and confirms that it was issued by the framework server 110. The transition component 168a may then decrypt the framework token 117 using the private key that corresponds to Kpsp. Once the transition component 168a has verified the legitimacy of the framework token 117, the transition component 168a issues a new SP token 167, e.g., by coordinating with the SP authentication server 166a. The plugin 164 and the SP 160 then use the new SP token 167 to conduct an authenticated session, which is shown at 470. Communications at 470 may involve the plugin obtaining web content 165a from the service provider and displaying the web content in the framework page 140, e.g., within the <DIV> described in connection with FIG. 3. The scope of authenticated communications may include any type of display content, such as text, pictures, video, audio, chat, and so forth and may involve a 2-way exchange of content between the plugin 164 and the SP 160. The illustrated arrangement thus allows a single authentication to the framework server 110 to be extended to an SP 160, or to any number of SPs 160, without requiring the user or client machine 120 to separately log on to each SP or to any SP.

Figure 5:
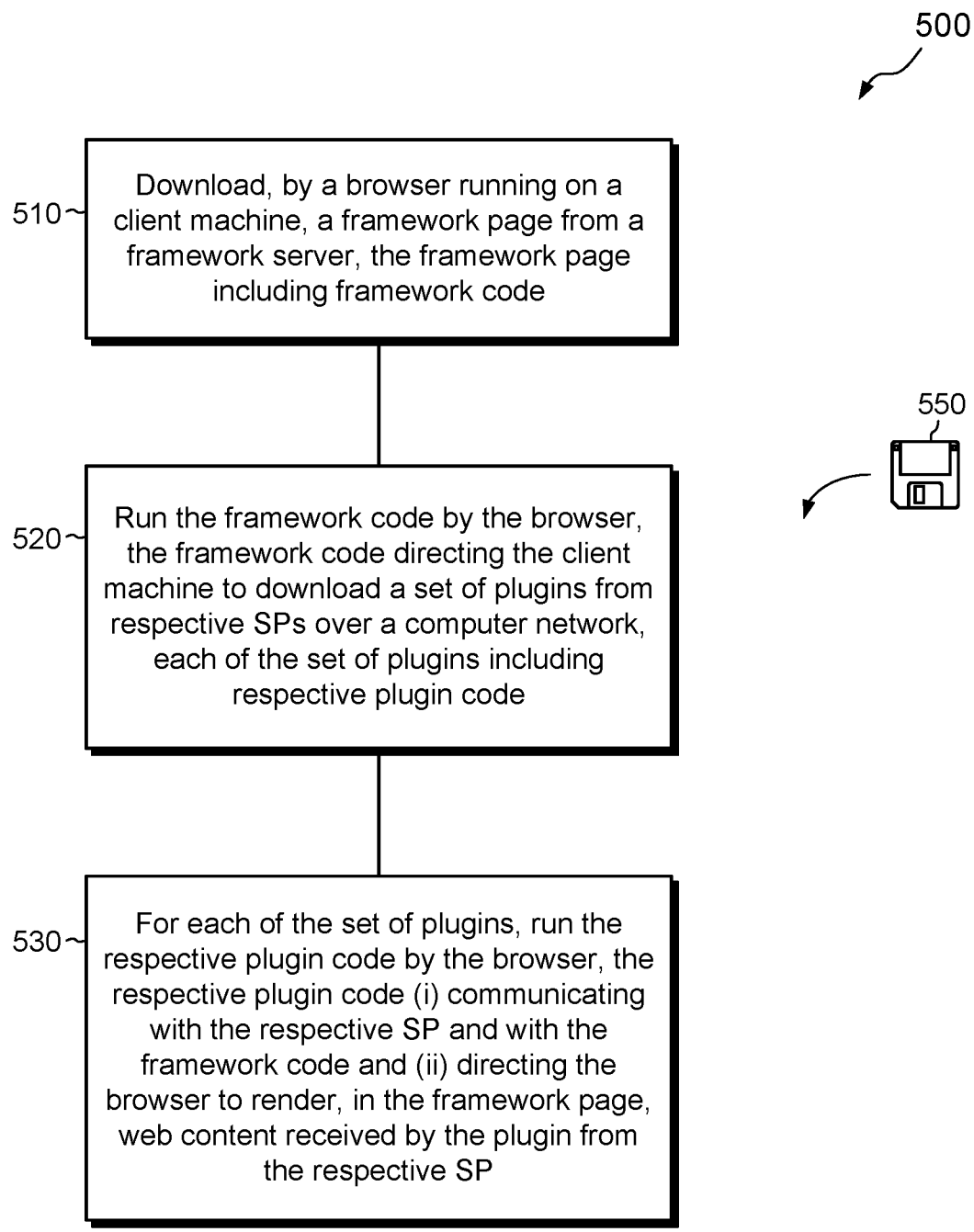
FIG. 5 is a flowchart showing an example method of rendering web content of SPs in the environment of FIG. 1.

FIG. 5 shows an example method 500 that may be carried out in connection with the environment 100. The method 500 is typically performed, for example, by the software constructs described in connection with FIG. 1, which reside in the memory 130 of the client machine 120 and are run by the set of processors 124. The various acts of method 500 may be ordered in any suitable way. Accordingly, embodiments may be constructed in which acts are performed in orders different from that illustrated, which may include performing some acts simultaneously.

At 510, a browser 132 running on a client machine 120 downloads a framework page 140 from a framework server 110. The framework page 140 includes framework code 142.

At 520, the browser 132 runs the framework code 142, and the framework code 142 directs the client machine 120 to download a set of plugins 164 from respective SPs 160 over a computer network 170. Each of the set of plugins 164 includes respective plugin code (e.g., 164a or 164b).

At 530, for each of the set of plugins 164, the browser 132 runs the respective plugin code, the respective plugin code (i) communicating with the respective SP 160 and with the framework code 142 and (ii) directing the browser 132 to render, in the framework page 140, web content 165a received by the plugin 164 from the respective SP 160.

An improved technique has been described for rendering web content 165a of service providers 160. The improved technique decouples a framework page from contents of plugins, effectively enabling the framework page to implement a static or seldom-changed shell while allowing the service providers to update their own components directly, by revising the plugins. Any changes made by plugin developers are reflected in rendered framework pages without delay and typically without any involvement of developers of the framework page. In addition, SSO is facilitated by permitting an exchange of a framework token for an SP token, which provides authenticated access to the SP based on prior authentication to the framework.

Having described certain embodiments, numerous alternative embodiments or variations can be made. Further, although features are shown and described with reference to particular embodiments hereof, such features may be included and hereby are included in any of the disclosed embodiments and their variants. Thus, it is understood that features disclosed in connection with any embodiment are included as variants of any other embodiment.

Further still, the improvement or portions thereof may be embodied as a computer program product including one or more non-transient, computer-readable storage media, such as a magnetic disk, magnetic tape, compact disk, DVD, optical disk, flash drive, solid state drive, SD (Secure Digital) chip or device, Application Specific Integrated Circuit (ASIC), Field Programmable Gate Array (FPGA), and/or the like (shown by way of example as medium 550 in FIG. 5). Any number of computer-readable media may be used. The media may be encoded with instructions which, when executed on one or more computers or other processors, perform the process or processes described herein. Such media may be considered articles of manufacture or machines, and may be transportable from one machine to another.

As used throughout this document, the words "comprising," "including," "containing," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Further, although ordinal expressions, such as "first," "second," "third," and so on, may be used as adjectives herein, such ordinal expressions are used for identification purposes and, unless specifically indicated, are not intended to imply any ordering or sequence. Thus, for example, a "second" event may take place before or after a "first event," or even if no first event ever occurs. In addition, an identification herein of a particular element, feature, or act as being a "first" such element, feature, or act should not be construed as requiring that there must also be a "second" or other such element, feature or act. Rather, the "first" item may be the only one. Although certain embodiments are disclosed herein, it is understood that these are provided by way of example only and that the invention is not limited to these particular embodiments.

Those skilled in the art will therefore understand that various changes in form and detail may be made to the embodiments disclosed herein without departing from the scope of the invention.

What is claimed is:

1. A method of rendering web content of service providers (SPs), the method comprising:
    downloading, by a browser running on a client machine operated by a user, a framework page from a framework server;
    running framework code of the framework page by the browser, the framework code directing the client machine to (i) identify network addresses of multiple plugins of respective SPs, (ii) download the plugins over a computer network, and (iii) obtain network addresses of respective SSO (Single Sign-On) endpoints of the respective SPs;
    authenticating the user to the framework server;
    issuing a framework token, the framework token providing authenticated access by the user to the framework server; and
    upon executing at least one of the plugins downloaded by the client machine, contacting, by the browser, the respective SSO endpoints to authenticate the user to the respective SPs using SSO.

2. The method of claim 1, further comprising:
    sending, by a first plugin downloaded from a first SP a request to the first SP to exchange the framework token for a first SP token, based on a pre-established trust relationship between the framework and the first SP; and
    proceeding with authenticated communications between the first plugin and the first SP without requiring additional user action.

3. The method of claim 2, further comprising:
    sending, by a second plugin downloaded from a second SP, a request to the second SP to exchange the framework token for a second SP token, based on a pre-established trust relationship between the framework and the second SP; and
    proceeding with authenticated communications between the second plugin and the second SP without requiring additional user action.

4. The method of claim 2, further comprising, prior to issuing the framework token, registering the first SP with the framework server, said registering establishing the trust relationship between the first SP and the framework server.

5. The method of claim 4, wherein establishing the trust relationship includes:
    providing the first SP with a public key of the framework server, the framework server having an associated private key; and
    providing the framework server with a public key of the first SP, the first SP having an associated private key of the first SP,
    wherein the framework token as received by the first plugin is encrypted using the public key of the first SP and signed using the private key of the framework server.

6. The method of claim 1, further comprising, after issuing the framework token,
    (i) sending, in a first transmission initiated by a first plugin, a first SSO request to the framework server, the first SSO request requesting authentication to a first SP using SSO,
    (ii) receiving, by the first plugin in response to the first SSO request, the framework token from the framework server;
    (iii) sending, by the first plugin, the framework token to the first SP;
    (iv) receiving, by the first plugin in response to sending the framework token, a first SP token issued by the first SP, and
    (v) conducting authenticated communications between the first plugin and the first SP using the first SP token without requiring separate user action to authenticate the user to the first SP.

7. The method of claim 6, further comprising, after issuing the framework token,
    (i) sending, in a second transmission initiated by a second plugin, a second SSO request to the framework server, the second SSO request requesting authentication to a second SP using SSO,
    (ii) receiving, by the second plugin in response to the SSO request, the framework token from the framework server;
    (iii) sending, by the second plugin, the framework token to the second SP;
    (iv) receiving, by the second plugin in response to sending the framework token, a second SP token issued by the second SP, and
    (v) conducting authenticated communications between the second plugin and the second SP using the second SP token without requiring separate user action to authenticate the user to the second SP.

8. The method of claim 1, further comprising incorporating a first plugin into the framework page such that the first plugin has access to a DOM (Document Object Model) of the framework page.

9. The method of claim 8, further comprising receiving, by the first plugin from the framework code, a DOM element of the framework page, and populating the DOM element with content received from the first SP.

10. The method of claim 9, wherein the DOM element is a <DIV> element, and wherein populating the DOM element includes placing the content received from the first SP into the <DIV> element.

11. The method of claim 9, further comprising, after populating the DOM element, sending, by the first plugin, a plugin-ready message to the framework code, the plugin-ready message indicating that the first plugin has been initialized.

12. The method of claim 1, wherein directing the client machine to identify the network addresses of the plugins includes obtaining configuration data over the network from the framework server, the configuration data including the network addresses of the plugins.

13. A client machine, comprising control circuitry that includes a set of processors coupled to memory, the control circuitry constructed and arranged to:
   download, by a browser running on a client machine operated by a user, a framework page from a framework server;
   run framework code of the framework page by the browser, the framework code directing the client machine to (i) download multiple plugins of respective SPs over a computer network, and (ii) obtain network addresses of respective SSO (Single Sign-On) endpoints of the respective SPs;
   authenticate the user to the framework server;
   issue a framework token, the framework token providing authenticated access by the user to the framework server; and
   upon executing at least one of the plugins downloaded by the client machine, contact, by the browser, the respective SSO endpoints to authenticate the user to the respective SPs using SSO.

14. The client machine of claim 13, wherein the control circuitry is further constructed and arranged to:
   prior to authentication of the user to any SP,
   exchange the framework token for a first SP token, based on a pre-established trust relationship between the framework and the first SP; and
   exchange the framework token for a second SP token, based on a pre-established trust relationship between the framework and the second SP.

15. A computer program product including a set of non-transitory, computer-readable media having instructions which, when executed by control circuitry of a client machine, cause the client machine to perform a method for rendering web content of service providers (SPs), the method comprising:
   downloading, by a browser running on a client machine operated by a user, a framework page from a framework server;
   running framework code of the framework page by the browser, the framework code directing the client machine to (i) download multiple plugins of respective SPs over a computer network, and (ii) obtain network addresses of respective SSO (Single Sign-On) endpoints of the respective SPs;
   authenticating the user to the framework server;
   issuing a framework token, the framework token providing authenticated access by the user to the framework server; and
   upon executing at least one of the plugins downloaded by the client machine, contacting, by the browser, the respective SSO endpoints to authenticate the user to the respective SPs using SSO.

16. The computer program product of claim 15, wherein the method further comprises:
   prior to authenticating of the user to any SP,; and
   exchanging the framework token for a first SP token, based on a pre-established trust relationship between the framework and the first SP.

17. The computer program product of claim 16, wherein the method further comprises exchanging the framework token for a second SP token, based on a pre-established trust relationship between the framework and the second SP.

18. The computer program product of claim 15, wherein the method further comprises incorporating a first plugin into the framework page such that the first plugin has access to a DOM (Document Object Model) of the framework page.

19. The computer program product of claim 18, wherein the method further comprises receiving, by the first plugin from the framework code, a DOM element of the framework page, and populating the DOM element with content received from the first SP.

20. The computer program product of claim 19, wherein the DOM element is a <DIV> element, and wherein populating the DOM element includes placing the content received from the first SP into the <DIV> element.

* * * * *